United States Patent [19]

Lupke

[11] Patent Number: 4,553,923
[45] Date of Patent: Nov. 19, 1985

[54] PRODUCING THERMOPLASTIC ARTICLES PARTICULARLY WITH POROUS WALLS

[76] Inventor: Manfred A. A. Lupke, 10 McLeary Ct., Concord, Ont. L4K 2Z3, Canada

[21] Appl. No.: 658,574

[22] Filed: Nov. 23, 1984

Related U.S. Application Data

[62] Division of Ser. No. 574,370, Jan. 27, 1984.

[30] Foreign Application Priority Data

Feb. 21, 1983 [CA] Canada .................................. 422058

[51] Int. Cl.⁴ ..................... B29C 17/00; B29D 23/03
[52] U.S. Cl. .................................... 425/393; 425/396; 425/403
[58] Field of Search ................ 425/392, 393, 396, 403

[56] References Cited

U.S. PATENT DOCUMENTS

| 2,876,824 | 3/1959 | West et al. | 425/396 X |
| 3,857,666 | 12/1974 | Barnett | 425/393 |
| 3,932,093 | 1/1976 | Maier | 425/392 |
| 3,966,384 | 6/1976 | Maier | 425/392 |
| 3,998,579 | 12/1976 | Nordström | 425/393 |
| 4,077,758 | 3/1978 | de Putter | 425/392 X |
| 4,136,143 | 1/1979 | Lupke et al. | 425/396 X |
| 4,510,013 | 4/1985 | Lupke et al. | 425/396 X |

Primary Examiner—J. Howard Flint, Jr.

[57] ABSTRACT

An article is molded from a thermoplastic material matrix having a particulate filler distributed throughout the matrix. The article is then expanded to develop fissures between the thermoplastic matrix material and particles of the filler material and particles of the filler material, so as to render the article porous. Apparatus for expanding a pipe from the inside or expanding the sides of corrugations in a pipe are also disclosed.

6 Claims, 4 Drawing Figures

PRODUCING THERMOPLASTIC ARTICLES PARTICULARLY WITH POROUS WALLS

This application is a division of application Ser. No. 574,370, filed Jan. 27, 1984.

The present invention relates to the production of porous articles from thermoplastic materials, and particularly to methods and apparatus for the production of such articles and articles produced thereby.

Porous thermoplastic articles have a variety of uses, for example, it is common in soil irrigation and drainage to use perforated corrugated thermoplastic pipe. The perforations in the pipe allow water to percolate in to or out of the pipe as necessary. The corrugations give the pipe radial rigidity. With the known pipes, the perforations are cut, sawn or drilled holes that can become clogged with soil and other foreign material. Soil can enter the pipe through the perforations. Attempts to solve these problems have lead to the use of fabric filter sleeves around perforated pipe and the use of ever smaller perforations.

The present invention concerns the provision of novel forms of porous article, especially pipe, and methods and apparatus for their production. While the invention has particular applicability to thermoplastic pipe that maybe used in soil irrigation and drainage; it is to be understood that it has general applicability to porous thermoplastic articles.

According to one aspect, the present invention provides a method of making a porous article comprising molding the article of a thermoplastic material having a particulate filler distributed therein and expanding the article to form fissures between the thermoplastic material and particles of the filler.

The expansion of the article, after its formation, will separate the thermoplastic matrix from the particles of filler material to form fissures in the article.

The fissures make the article porous. They may, if small, act as capilliary passages through a wall so that liquids can seep through the article, for example into and out of a pipe. Larger fissures will permit a more rapid flow.

The article may be cooled after molding to set the thermoplastic matrix and then heated before expansion to bring the thermoplastic to a desired temperature for expansion.

A wide range of filler materials may be used. For example, minerals, metal powders or even absorbent material such as sawdust may be employed. The filler should be selected such that any bonds formed between the matrix and the filler are weaker in tension than the matrix material under the conditions prevailing during expansion.

According to another aspect, the present invention provides a porous article comprising a matrix of thermoplastic material, a particulate filler material distributed in the matrix and fissures in the matrix adjacent particles of the filler.

The article may be a pipe, particularly a corrugated pipe such as those used for drainage.

It is possible to provide articles with selected areas of different porosites by differential expansion of the areas in question. For example, in a corrugated pipe the sides of the corrugations may be porous while the remainder of the pipe is not.

According to a further aspect, the present invention provides an expander for enlarging a pipe as it is advanced along a feed path, said expander comprising a plurality of spindles adapted to be located within the pipe with the spindles diverging in a downstream direction and drive means for revolving the spindles about the axis of the pipe.

For use with corrugated pipe, each spindle may have a ribbed outer surface for engaging the pipe corrugations. Means may be provided for rotating the spindles about their axes to advance the pipe along its feed path.

Also according to this aspect, the invention provides an expander comprising a set of inner spindles with transversely ribbed surfaces, a set of outer spindles with transversely ribbed surfaces, means mounting the inner spindles for passage of a pipe thereover, means mounting the outer spindles opposite the inner spindles for passage of the pipe therebetween, and means for revolving the spindles about the pipe.

The spindle ribs may increase in depth from an upstream end to a downstream end so that when the pipe is passed between the inner and outer spindles the corrugations are deepened, thus expanding their sides. This yields porous corrugation sides and impervious or less porous corrugation crests and bases. An apparatus of this type can also be used for rolling a corrugated profile into a smooth pipe.

The apparatus may include a pipe producing means, a cooler for setting the pipe after it has been produced and a heater for heating the cooled pipe before it is expanded.

The pipe producing means may differ depending on the pipe to be produced. For corrugated pipe, an extruder and a pipe molding apparatus known as a corrugator is suitable, while with smooth-walled pipe an extruder and a vacuum sizer may be used.

The expansion of a thermoplastic material orients the material and increases the material strength. The apparatus, particularly the expander, may therefore be used for orienting thermoplastic pipe as a sole effect.

In the accompanying drawings, which illustrate exemplary apparatus according to the present invention:

Figure 1:
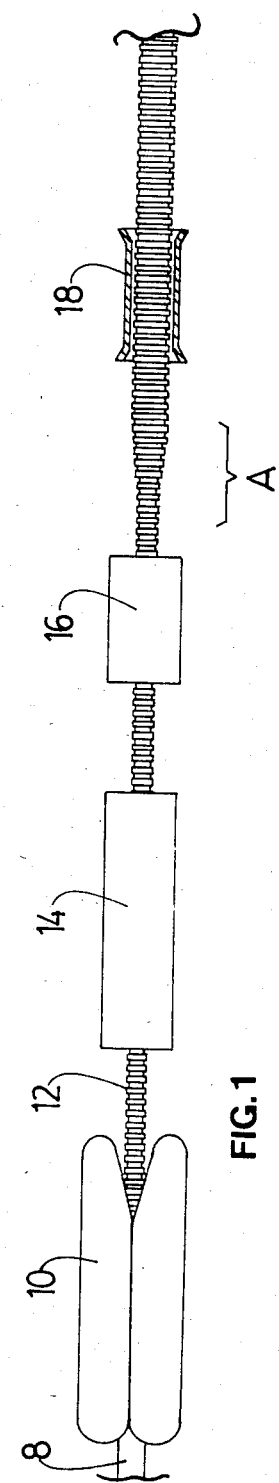
FIG. 1 is a schematic elevation illustrating an apparatus for producing a corrugated pipe.

Referring to the drawings, FIG. 1 schematically illustrates an extruder die 8 and a corrugator 10 of known form for producing a corrugated thermoplastic pipe 12. An extruder die and corrugator of this type are disclosed in Lupke U.S. Pat. No. 3,981,663, issued Sept. 21, 1976.

In the present case, the pipe is made from a thermoplastic material matrix with a particulate filler distributed in the matrix. After leaving the corrugator 10, the pipe 12 passes through a cooler 14 to ensure setting of the thermoplastic material. Downstream from cooler 14, the pipe is reheated in a heater 16 and then passed over an expander inside the pipe at section A. If desired, a pipe guide 18 may be located downstream of the expander section A. The corrugator 10, cooler 14, heater 16 and guide 18 are known elements and will not be described in further detail.

Passing the pipe over the expander develops fissures in the pipe between the particles of filler and the thermoplastic matrix, so that the pipe downstream of the expander is porous. The porosity of the pipe will depend on the amount and nature of the filler material and the degree of expansion.

Figure 2:
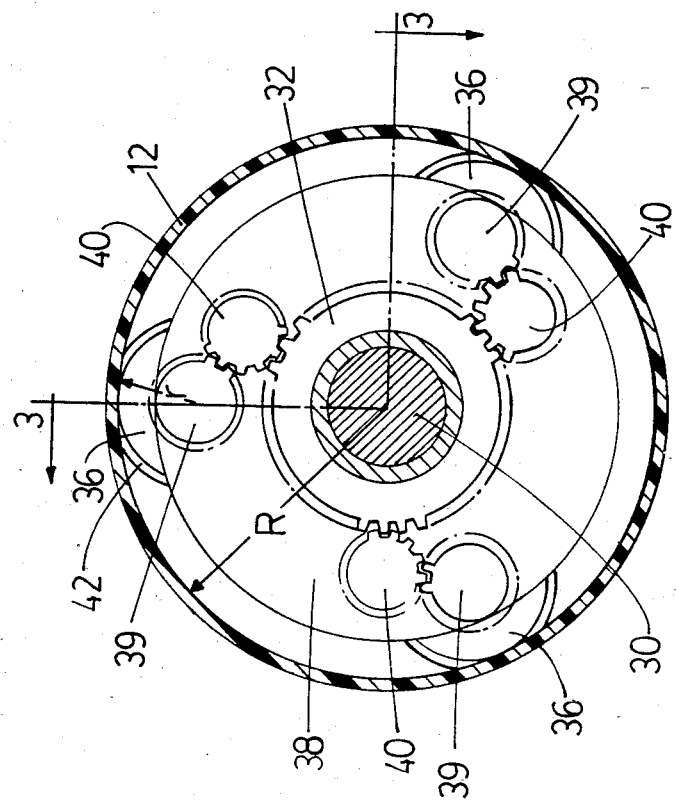
FIG. 2 is a sectional view of a portion of the apparatus of FIG. 1 taken on line 2—2 of FIG. 3.
Figure 3:
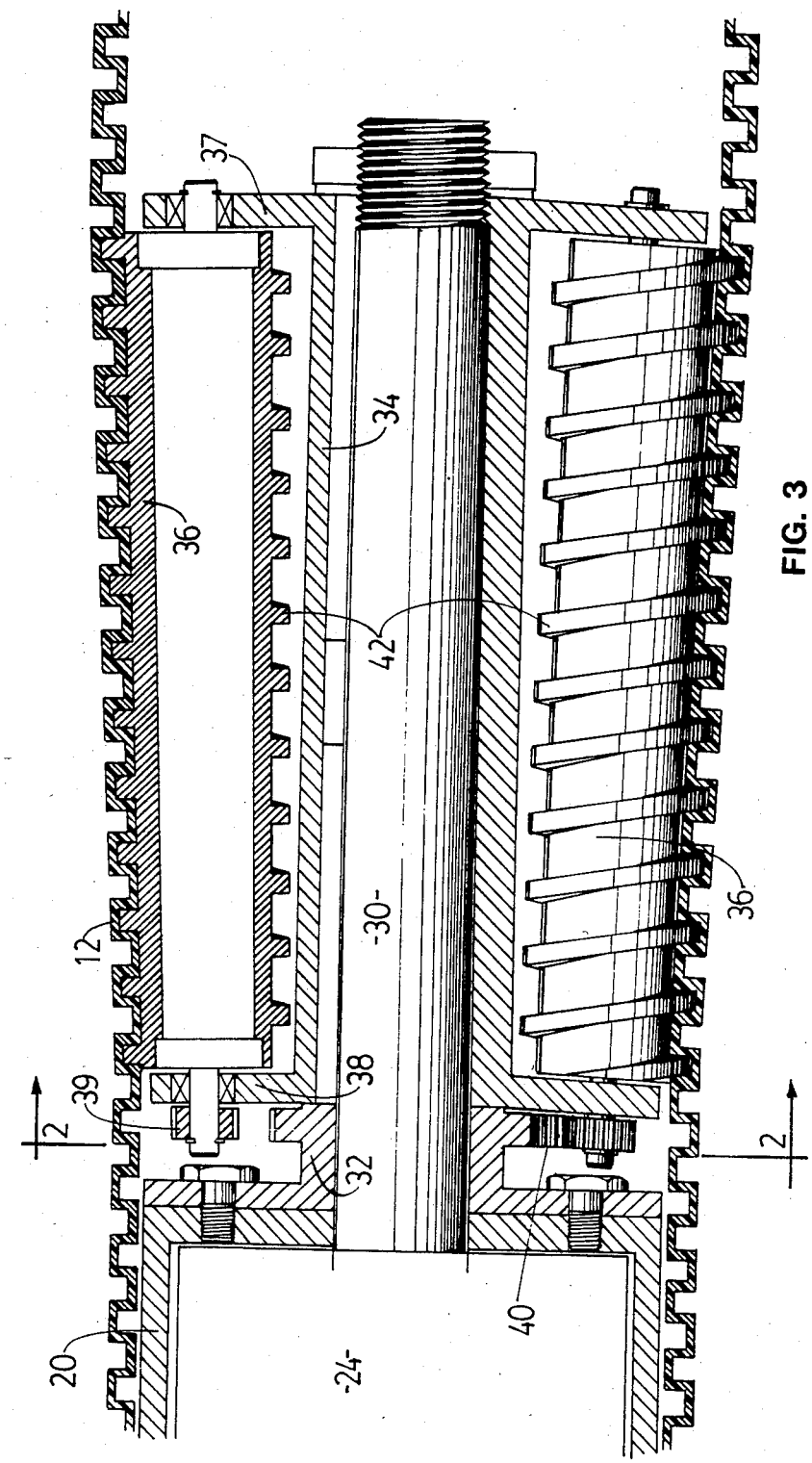
FIG. 3 is a sectional view on line 3—3 of FIG. 2.

The expander is more clearly shown in FIGS. 2 and 3. A pipe 20 extends along the pipe 12 from the extrusion die 8, through the corrugator 10, the cooler 14 and the heater 16. At the downstream end of the pipe 20 is an air motor 24 mounted on an end flange of the pipe by machine screws 28. The drive shaft 30 of the motor 24 extends through a ring gear 32 mounted on the downstream side of the flange 26. A spool 34 is keyed to the drive shaft 30 downstream of ring gear 32. Three spindles 36 are carried by the end flanges 37 and 38 of spool 34. The spindles are frusto-conical, widening in the downstream direction. The spindles also diverge in the downstream direction, as shown most particularly in FIG. 2. At their upstream ends, the spindles fit into the unexpanded diameter of the pipe 12.

Each spindle 36 carries a gear 39 at its upstream end, meshing with an idler 40 mounted on the end flange 38 of the spool 36. The idler 40 also meshes with the ring gear 32 so that upon rotation of the spool 36, the spindles are revolved about the axis of the pipe and rotated about their axes.

Each spindle 36 has a helical rib 42 on its outer surface that is configured to mate with the corrugations in the tube 12.

In operation, the motor 24 rotates the spool 34. This revolves the spindles around the inside of the pipe while the gears 39, idlers 40 and ring gear 32 rotate the spindles about their respective axes. The ribs on the spindle engage the corrugations of pipe 12 and draw the pipe over the expander to its large diameter end. The pipe is progressively expanded along the expander to its final diameter where it runs off the spindles.

It is desirable to prevent rubbing of the spindles on the inner surface of the tube. That is, the peripheral speed of each spindle should be zero at its point of contact with the non-rotating pipe. If the spool is rotating at an angular speed $W_1$ and the spindle is rotating about its axis at an angular speed $W_2$, the rerequired condition is:

$$W_1R - W_2r = 0 \tag{1}$$

or $$r/R = W_1/W_2 \tag{2}$$

where R is the inner radius of the pipe and r is the spindle radius at the base of the ribs.

This can be achieved if the gear ratio of gear 39 to ring gear 32 is equal to r/R. Since the ratio of angular speeds W1/W2 is constant, the other implication of equation (2) is that the radii of the pipe and the spindle should vary in direct proportion along the pipe. This requires the spindles to diverge downstream, as well as increasing in radius, an arrangement that is illustrated in FIG. 2.

Figure 4:
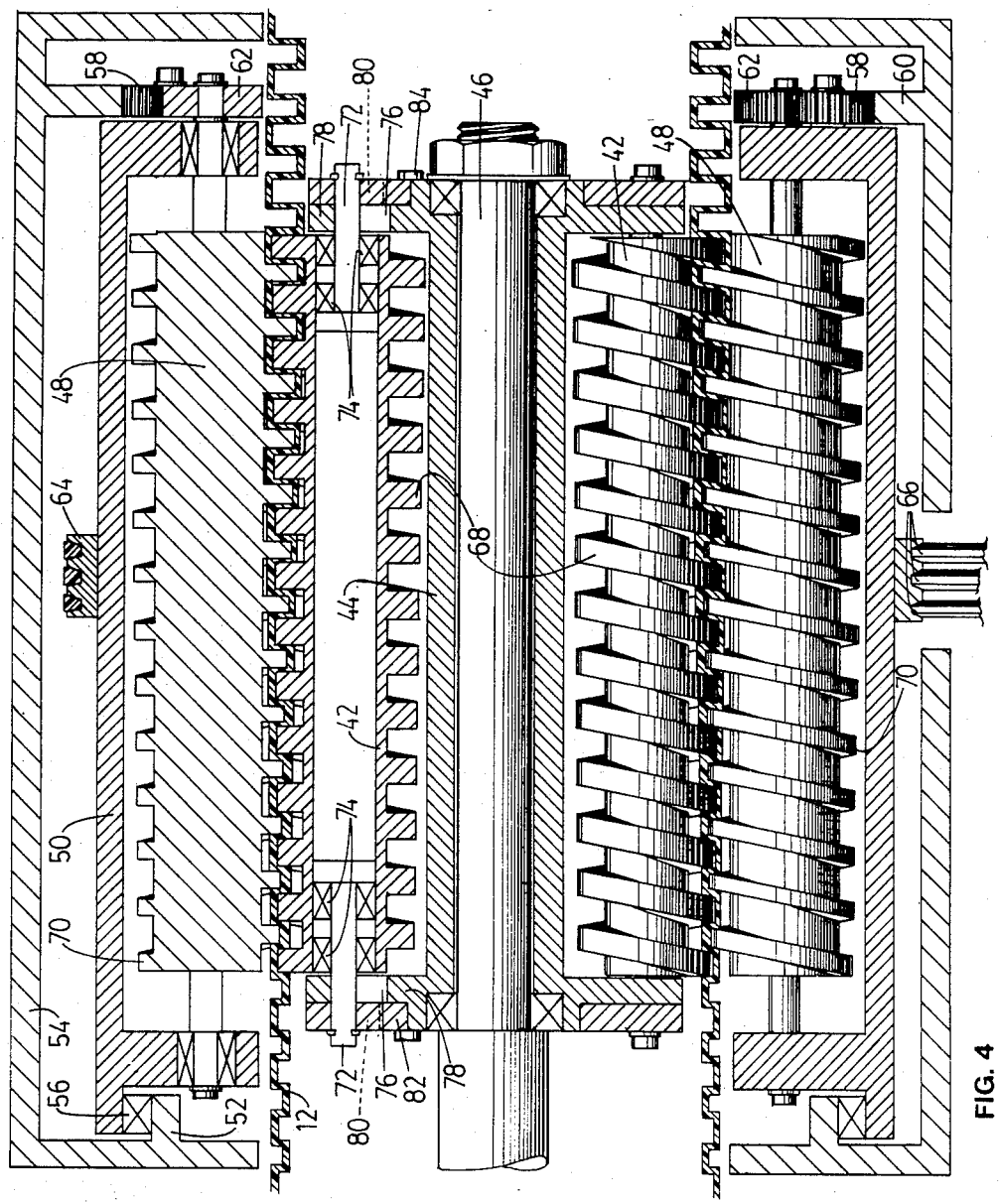
FIG. 4 is a view like FIG. 3 of another embodiment of the apparatus.

FIG. 4 illustrates an alternative form of expander, including a set of inner spindles 42 that are cylindrical and parallel to the axis of the pipe 12. The inner spindles 42 are carried rotatably by a spool 44, which is rotatable on a shaft 46 extending along the axis of the pipe from the expander to the extruder. A second set of spindles 48 is arranged symetrically around the outside of the pipe 12 on a spindle carrier 50. Spindles 48 are also cylindrical and parallel to the axis of the pipe 12. Each of the spindles 48 is arranged opposite an inner spindle 42.

At one end, the spindle carrier 50 is mounted on a flange 52 of an expander housing 54 by a bearing 56. The other end of the carrier supports idler gears 58 meshing with a stationary ring gear 60 on the housing 54. The adjacent ends of outer spindles 48 carry gears 62 that mesh with idlers 58. The gear ratio of ring gear 60 to gears 62 is a function of the diameter of the pipe 12 and the diameter of the spindles 48. The ratio is selected to ensure that the tangenitial speed of each spindle 48 is zero at its point of contact with the pipe 12.

The spindle carrier 50 has a sheave 64 around its centre, entraining a series of drive belts 66. The belts are in turn entrained about a drive sheave (not shown) driven by an electric motor (also not shown).

The inner spindle 42 and the outer spindles 48 carry transverse ribs 68 and 70 respectively. The ribs on each spindle are tapered so as to increase in depth from the upstream end of the spindle to the downstream end. In use, the pipe 12 passes through the expander with its corrugations meshed between the ribs 68 and 70. The spindles 42 and 48 are located relative to one another so as to grip the corrugations of pipe 12 between them and to increase the depth of the corrugations and thus to stretch the sides of the corrugations.

Rotation of carrier 50 by drive belt 66 revolves the outer spindles 48 about the pipe 12, while the planetary gear train constituted by gears 58, 60 and 62 rotates the spindles about their individual axes. The inner spindles 42 will follow the outer ones around the pipe due to the tight meshing engagement of the ribs 68 and 70 through the pipe 12.

In order to stretch the pipe 12 by varying amounts in different runs, the spindles 42 are adjustably mounted on the spool 44 for movement toward and away from the outer spindles 48. Each spindle 42 has a stub shaft 72 carried at each end by bearings 74. The shaft extends through a radial slot 76 in the associated one of flanges 78 of the spool 44 and a slot 80 extending at an angle to both the radial and tangential directions in an annular adjustment plate 82 resting on the outer face of flange 78. The plate 82 is held in place by machine screws 84 extending through respective circumferential slots in the plate and threaded into bores in the flange 78. To adjust the position of the spindles 42, the machine screws 84 are loosened, the plates 82 are turned about the axis of the pipe to move the stub shafts 72 along the slots 76. Once the spindle positions are adjusted, the machine screws 84 ar tightened.

The tapering of the ribs towards the upstream end, allows the pipe to run readily into the expander. The corrugations will gradually be deepened as they pass through the apparatus. An arrangement of this sort may also be used for rolling a corrugated profile into a smooth walled pipe.

In the illustrated embodiments, the ribs are helical. It is also possible to use annular ribs where the pipe has helical corrugation.

I claim:

1. An expander for enlarging a pipe as it is advanced along a feed path, said expander comprising a plurality of spindles adapted to be located within the pipe with the spindles diverging in a downstream direction and drive means for revolving the spindles about the axis of the pipe.

2. An expander according to claim 1 wherein the drive means is also operable to rotate each spindle about its own axis.

3. An expander according to claim 2 wherein each spindle has a helical rib on an outer surface thereof.

4. Apparatus according to claim 1 wherein the spindles include transverse ribs on their outer surfaces and means are provided for rotating the spindles about respective axes so as to advance the pipe in a downstream direction.

5. An expander comprising a set of inner spindles with transversely ribbed surfaces, a set of outer spindles with transversely ribbed surfaces, means mounting the inner spindles for passage of a pipe thereover, means mounting the outer spindles opposite the inner spindles for passage of the pipe therebetween, and means for revolving the spindles about the pipe.

6. An expander according the claim 5 including means for adjusting the relative radial positions of the inner and outer spindles.

* * * * *